C. W. DE KAY.
PLOW ATTACHMENT.
APPLICATION FILED JUNE 5, 1909.
938,647.
Patented Nov. 2, 1909.
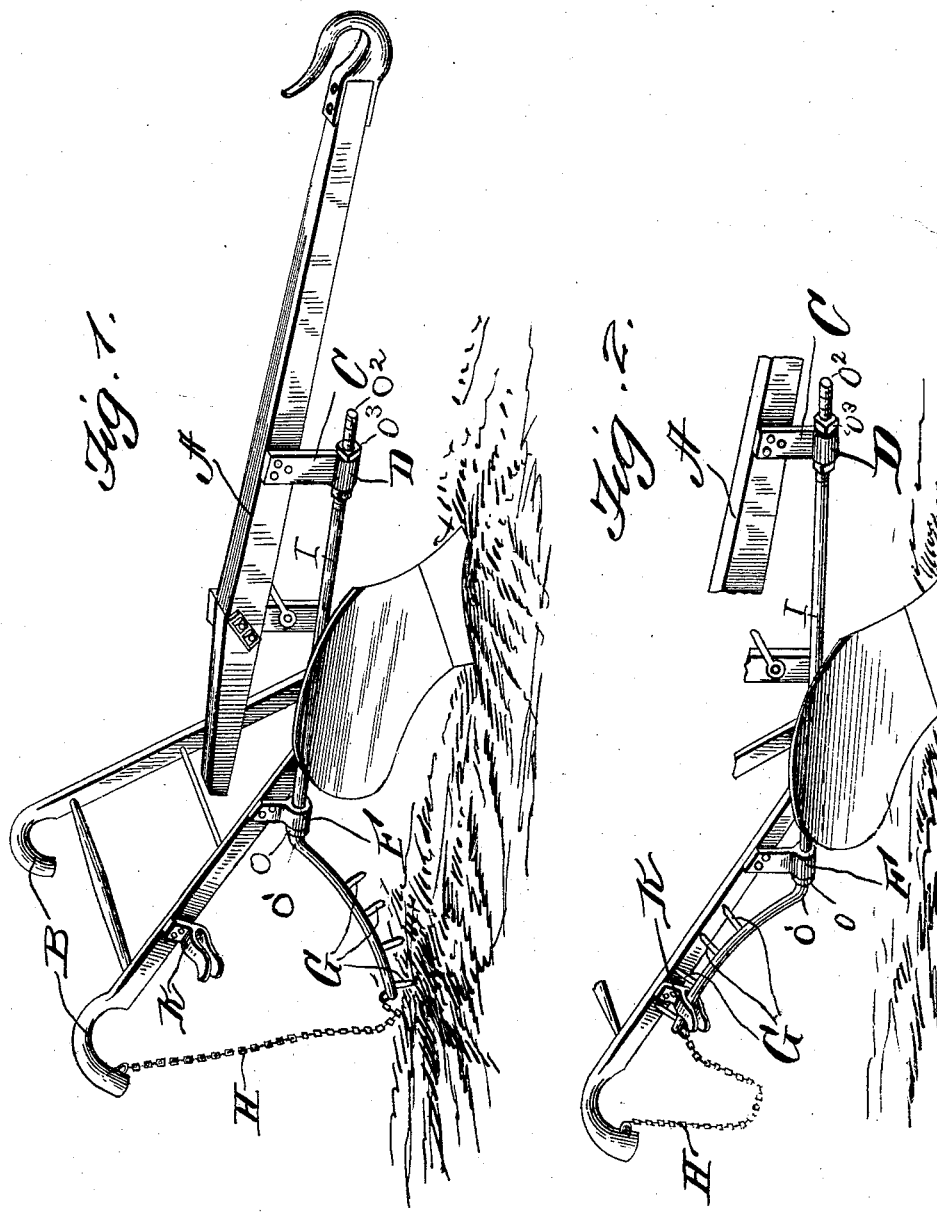

UNITED STATES PATENT OFFICE.

CHARLES W. DE KAY, OF BYRON, NEW YORK.

PLOW ATTACHMENT.

938,647.

Specification of Letters Patent.

Patented Nov. 2, 1909.

Application filed June 5, 1909. Serial No. 500,416.

*To all whom it may concern:*

Be it known that I, CHARLES W. DE KAY, a citizen of the United States, residing at Byron, in the county of Genesee and State of New York, have invented certain new and useful Improvements in Plow Attachments, of which I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in plow attachments and comprises a pivoted rod adapted to be fastened to the beam of a plow and provided with drag teeth which are provided for the purpose of combing or breaking up the furrow as it is turned by the plow, means being provided for holding the rod out of operative position.

The invention comprises various other details of construction and combinations and arrangements of parts which will be hereinafter fully described and then specifically defined in the appended claims.

I illustrate my invention in the accompanying drawings, in which:—

Figure 1 is a perspective view showing the apparatus as applied to a plow, and Fig. 2 is an enlarged detail view showing the manner of holding the rod out of operative position.

Reference now being had to the details of the drawings by letter, A designates an ordinary beam having the handles B and fastened to said beam is a bar C having an eye therein, in which one end of the rocking rod is journaled, the rear portion of said rod being laterally curved. A second eye F projects from one of the plow handles forming a second journal for the rod which passes therethrough. A portion of the bar is provided with teeth G projecting therefrom and a chain H is fastened to the upper end of said rod and affords means whereby the angled portion of the rod carrying the teeth may be raised and lowered. In order to hold said rod from longitudinal movement, I provide a collar O which is fixed to the rocking rod I adjacent to the angle O' of said rod and upon the threaded end $O^2$ of the rod I provide a threaded screw $O^3$.

K designates a clamp member which is fastened to one of the handles of the plow and has a clip N adapted to engage and hold the rod out of an operative position and up against the handle in the manner shown.

The operation of my apparatus is as follows:—When it is desired to throw the rod into an operative position, it may be done by twisting the end of the rod which is held against the handle and allowing the rod to turn in its bearings so that the teeth G will comb or drag through the furrow which has been turned by the mold board, it being noted that the angled portion of the rod carrying the teeth is positioned in the rear of the mold board. By means of the chain, the end of the rod may be held at different positions accordingly as may be desired.

What I claim to be new is:—

In combination with the beam and handles of a plow, bars fastened one to the beam and the other to the shank portion of the handle of the plow, a rocking rod journaled in bearings at the lower ends of said bars and positioned intermediate the plow beam and share, said rocking rod having a curved portion with teeth thereon at its rear end, a collar upon the rocking rod adjacent to the bearing upon the handle, and a nut mounted upon the forward threaded end of the shaft and coöperating with the collar for moving the shaft longitudinally.

In testimony whereof I hereunto affix my signature in the presence of two witnesses.

CHARLES W. DE KAY.

Witnesses:
F. T. MILLER,
E. H. CHAPELL.